United States Patent Office 3,701,766
Patented Oct. 31, 1972

3,701,766
PROCESS FOR THE POLYMERIZATION OF
α-OLEFINS
André Delbouille and Henri Toussaint, Brussels, Belgium, assignors to Solvay & Cie, Brussels, Belgium
No Drawing. Original application Aug. 29, 1968, Ser. No. 756,330, now Patent No. 3,594,330, dated July 20, 1971. Divided and this application Mar. 17, 1971, Ser. No. 125,327
Claims priority, application France, Aug. 31, 1967, 119,563
Int. Cl. C08f 1/56, 3/10
U.S. Cl. 260—93.7  9 Claims

ABSTRACT OF THE DISCLOSURE

Polymerization of α-olefins is carried out in the presence of a solid catalyst which is composed of an organic compound of a metal of Groups I to III of the Periodic Table and a crystalline halide of a reduced metal of Groups IVb, Vb or VIb of the Periodic Table deposited on a pulverulent support. The reduced metal halide is obtained by reducing a halide of the metal at its maximum valence with an organometallic compound at a temperature below 0° C. and in the absence of liquid diluent wherein the halide of the metal at its maximum valence or the organometallic compound has been absorbed on a solid pulverulent support prior to the reduction. Catalysts prepared in this manner have a high stereospecificity and catalytic activity, and polymerization carried out in the presence thereof yields highly isotactic crystalline polymer.

This is a division of our copending U.S. patent application, Ser. No. 756,330, filed Aug. 29, 1968, which has issued on July 20, 1971 as U.S. Pat. No. 3,594,330.

BACKGROUND OF THE INVENTION

This invention is directed to a process for the stereospecific polymerization of α-olefins in the presence of improved solid catalysts.

According to the prior art, the stereospecific polymerization of α-olefins, such as propylene, to form crystalline polymers having large contents of isotactic units is carried out very easily in the presence of Ziegler type catalysts, in which the inorganic component is a violet variety of crystalline titanium trichloride.

Violet $TiCl_3$ is manufactured by reducing $TiCl_4$, under appropriate conditions, by means of various reactive agents such as hydrogen, metallic aluminum or an organic derivative of aluminum. The relatively critical conditions under which $TiCl_3$-α is prepared are such that the product is very expensive.

On the other hand, up to the present time, the preparation of stereospecific catalysts directly from $TiCl_4$, with the formation of violet $TiCl_3$, either in situ or immediately before the polymerization, has required a series of delicate manipulations which are difficult to realize on an industrial basis.

Furthermore, the catalytic activity of stereospecific catalysts prepared from violet $TiCl_3$ is not particularly high. As a consequence, the cost of this part of the catalyst contributes substantially to increase the cost of the preparation of the polyolefin. In addition, polyolefin prepared in this manner requires considerable purification in order to eliminate the important $TiCl_3$ catalyst residues contained therein.

It is therefore particularly desirable to find a stereospecific catalyst which is not expensive and which has a very high catalytic activity.

High catalytic activity should be attained in particular by depositing violet $TiCl_3$ on a solid having a large surface, in order to obtain a stereospecific catalyst having a large active area.

However, all the efforts which have been made up to now in depositing $TiCl_3$ on a solid have not been rewarded due to the difficulty of realizing a suitable deposit of violet $TiCl_3$ on a support without losing either its activity or its stereospecificity. It should be noted that violet $TiCl_3$ is a crystalline solid which is practically insoluble in all the well known solvents. Therefore, it is believed that it would be impossible to impregnate a support with violet $TiCl_3$ in contrast to what may be accomplished easily by using a liquid or a compound having high solubility.

Another possibility would be to impregnate the support with $TiCl_4$ and then to reduce the same into violet $TiCl_3$. This method has been used already for the preparation of stereospecific catalysts mounted on a support, but it has only resulted in an additional complication caused by the already complex processes of reducing $TiCl_4$ which is present on the support. In any case, this method which is disclosed in Belgian Pats. No. 603,090 of April 26, 1961 and No. 608,977 of Oct. 9, 1961 has resulted only in the production of catalysts having a reduced stereospecificity and/or activity.

SUMMARY OF THE INVENTION

The object of the present invention is the provision of an improved method for polymerizing α-polymers, particularly the stereospecific polymerization of α-polymers.

Another object of the present invention is the provision of a new highly active and stereospecific catalyst for the polymerization of α-olefins.

A further object of the present invention is to provide a simple and economical process for obtaining at low cost a catalyst for the polymerization of olefins, which is both very active and which has a noted stereospecificity.

According to the invention, α-olefins are polymerized in the presence of a solid catalyst comprising a combination of an organic compound of a metal of the Groups I to III of the Periodic Table and a reduced crystalline halide of a metal of the Groups IVb, Vb, or VIb of the Periodic Table, which is deposited on an inert porous solid support. The reduced halide is obtained by reducing, in the absence of any liquid diluent and at a temperature lower than 0° C., a halide of a metal of Groups IVb, Vb or VIb, the metal being at its maximum valence. The reducing agent is an organometallic compound which is identical to or different from the above component of the polymerization catalyst. Prior to the reduction, one of the reactants, i.e. either the halide of a metal at its maximum valence or the organometallic compounds, is absorbed on a solid pulverulent support material and the reduction is carried out by combining the unabsorbed reactant with the support which has been impregnated with the other reactant. The quantities of solid support, of metal halide wherein the metal is at its maximum valence and of the organometallic compound are chosen so that the reaction mixture remains pulverulent.

DESCRIPTION OF THE PREFERRED EMBODIMENTS

The supports which are used to carry out the process according to the invention should be inert towards the reactants utilized for the preparation of the catalysts, and for the polymerization. They should be free of active groups such as hydroxyl groups, which can react with the halides of the transition metals or with the organic derivatives of aluminum. If such active groups are present, they should be in sufficiently low quantity with respect to the other reactants, that they do not consume an important portion thereof.

Since the reduction is carried out in such a manner that the reaction mixture always remains pulverulent, it is advantageous to use a porous support. In this case, the reaction can be carried out within the pores of the support. Therefore, it is important that these pores have a volume sufficiently large to enable the support to absorb completely at least one of the above reactants, and preferably the two reactants used in the reduction process.

The following are particularly interesting supports for the preparation of stereospecific catalysts: alumina and in particular α-alumina or corundum, silica, aluminum silicates such as the catalyst supports called silica-alumina and the kaolins, the magnesium silicates, magnesia, titanium oxide, calcium carbonate, etc. Polyolefins themselves are particularly suitable provided they are sufficiently porous. For example, it has been found that polyethylene and polypropylene may be used successfully.

When a polyolefin which is identical to the one formed during the polymerization is used as the support, it has the particular advantage of preventing all contamination of the polyolefin by the catalyst support.

The maximum valence metal halides, wherein the metal is selected from those in Groups IV$b$, V$b$ or VI$b$ which are to be reduced, should be in a liquid form, as is normal for practically all the compounds of this class. Titanium tetrachloride and vanadium tetrachloride are preferred metal halides.

An organic compound of a metal of the Groups I to III of the Periodic Table, preferably an organometallic derivative of aluminum, may be used as reducing agent. The reducing agent may be selected from the group consisting of trialkylaluminum, dialkylaluminium halides, alkylaluminum sesquihalides, monoalkylaluminum dihalides, alkylaluminum hydrides and the organometallic complexes containing two metals in which one is aluminum, and the compounds obtained by replacing the alkyl groups by cycloalkyl, aryl, arylalkyl or alkylaryl groups, in the above derivatives, wherein the replacing groups from 6 to 12 carbon atoms, such as tricyclohexylaluminum, diphenylaluminum chloride, tribenzylaluminum and tritolylaluminum. Preferably, the alkylaluminum and alkylaluminum halides used as reducing agents in the present process are those in which the alkyl group contains from 1 to 12 carbon atoms, such as trimethylaluminum, triethylaluminum, triisobutylaluminum, diethylaluminum chloride, diethylaluminum iodide, Diisobutylaluminum chloride, di-n hexylaluminum chloride, ethylaluminum sesquichloride, ethylaluminum dichloride, n-butylaluminum dichloride, diisobutylaluminum hydride, di-n dodecylaluminum hydride and isobutylaluminum dihydride.

It is especially convenient to use lower-alkylaluminum, lower-alkylaluminum halides, in particular diethylaluminum chloride, triethylaluminum and triisobutylaluminum.

The reduction is preceded by the step of absorbing the halide or the organometallic compound on the support.

Before being used, the supports should be dried very carefully, by heating at a temperature of 100 to 400° C. for a sufficient period of time, or in the case of the supports which cannot withstand the above treatment, by a treatment under vacuum at a lower temperature.

The anhydrous support so obtained is thereafter contacted with any of the liquid reactants used in the reduction process, such as the halides of transition elements or the organometallic derivatives.

The absorption of the reactant within the pores of the support is generally carried out at room temperature, i.e. 18 to 25° C. However, the temperature is not critical, since the absorption may be carried out at a higher or lower temperature.

As in the case of all the reduction steps, the absorpttion is carried out in the absence of liquid diluent, by simply contacting the support with at least one of the pure liquid reactants.

The proportions of the reactant to be absorbed, and of the support to be used are chosen in such a manner that the volume of the reactant is not higher than the total volume of the pores which could absorb the reactant. In practice, these proportions are adjusted so that the mixtures remains pulverulent.

The relative proportions of the reactant to be absorbed and of the support cannot be determined a priori from the physical properties of the support, for example from the volume of pores, as measured according to standard methods. To determine the maximum quantity of reactant which can be used, i.e. the volume of the pores open to this reactant, a practical test is employed which consists in measuring the maximum quantity of the particular reactant which can be absorbed by the support before it begins to be moist or sticky, or not pulberulent.

The reduction within the pores of the support is carried out at a temperature lower than 0° C. and preferably, a temperature of about $-100°$ C. to 0° C. may be used. The reaction is carried out advantageously at a temperature between $-50°$ and $-10°$ C. A temperature which is too high, particularly a temperature higher than about 0° C., leads to the formation of less active catalyst. On the other hand, too low a temperature even if it does not contribute to lower the activity of the stereospecificity of the catalyst, contributes to increasing the length of time required for the reduction.

During the reduction, the proportions of the two reactants should be such that the atomic ratio of the metal of the Groups I to III to the transition metal is lower or only slightly higher than 1. Thus, in the present process the atomic ratio of the metal (M) of Groups I to III to the transition metal ($M_T$), i.e. $M/M_T$, is in the range of 0.3 to 1.5:1 and preferably about 0.5 to 1.2:1. Provisions are generally made so that the ratio of the number of alkyl groups to the number of atoms of the transition metal is between about 0.5 and 2, and most preferably between 0.9 and 1.5.

In general the two reactants are mixed progressively with one another. The easiest way is to add the liquid reactant dropwise to the granular support having absorbed thereon the other reactant. The addition is made while the mixture is agitated.

Since the reaction must be carried out at low temperature, at least one of the reactants should be cooled to a sufficiently low temperature prior to the reaction. For example, the solid support may be cooled to a temperature lower than the reaction temperature while adding thereto the other reactant, which may or may not have been previously cooled.

The reduction is carried out under completely anhydrous conditions, in an atmosphere free of oxygen. For example, the reaction may be carried out by flushing the mixture with pure dry nitrogen.

After having completed the reduction or after having substantially completed the reaction, the solid catalyst thus obtained is warmed to room temperature.

The catalyst is then washed with pure anhydrous hexane in order to eliminate any compound which is soluble in the solvent. The reduced crystalline halide which is insoluble in the solvent remains absorbed on the support In each case, the proportions of the reactants and the reducing conditions are so chosen that the reduction is as complete as possible in order to provide a catalyst with a maximum stereospecificity.

By measuring the distribution and the volumes of the pores on the untreated support and on the completely processed support which contains the reduced halide, it is possible to determine that the reduced halide is located within the pores of the support.

After having been formed on the support, the reduced halide may be submitted to a heat treatment to a temperature of 50° to 300° C., in order to increase its stereospecificity. However, it has been found that the above thermal treatment may nearly always be omitted since the catalyst as such already has a more than sufficient stereospecificity.

The stereospecific catalysts used in the process according to the invention are therefore obtained in a simple process by simply contacting various reactants in the absence of solvent. In the above process, there is no purification cycle of the solvents as is normally the case; the catalyst does not have to be manipulated under very delicate conditions, for example, at high temperatures; and even the heat treatment of the catalyst may be dispensed with.

The supported stereospecific catalyst according to the invention is used for the polymerization of olefins in accordance with known procedures. Generally, it should be activated by an organometallic compound of a metal of Groups I to III of the Periodic Table, particularly an organoaluminum compound such as trialkylaluminum or an alkylaluminum halide. Diethylaluminum chloride has been found to be a particularly efficient activator since it is a catalyst having maximum activity and stereospecificity.

The stereospecific polymerization of $\alpha$-olefins may be carried out in accordance with any known procedures:

in the gaseous phase, in the absence of a liquid medium;
as a dispersion in an insert solvent, preferably a hydrocarbon;
as a dispersion in the monomer itself, which is liquid under its pressure of saturation.

The process according to the invention generally may be used to polymerize any $\alpha$-olefins, for example ethylene, propylene, butene-1, pentene-1, methylbutene-1, hexene-1, 3-methyl and 4-methyl-pentene-1, long chain $\alpha$-olefins and styrene. It is particularly interesting for polymerizing propylene, butene-1 and 4-methyl-pentene-1 and to produce highly isotactic crystalline polymers.

Because of the very high catalytic activity of the catalysts according to the invention, the polymerization process of the invention is simpler and often does not even require a final purification of the polymer, a purification which is always required and which is very complicated when using the known catalyst prepared from violet titanium trichloride. This is one of the main advantages of the invention.

It should also be noted that when using the above catalysts, it is possible to exercise complete control of the morphology of the polymer; there is a parallel between the morphology of the support and that of the polymer. For example, when the support is formed with microspheres, there is obtained a polymer in the form of small spheres in which the diameter is a function only of the productivity.

The following examples are intended to illustrate the best mode contemplated for carrying out the present invention and must not be construed as limiting the scope of the invention in any manner whatsoever. Examples designated by the letter R are not examples of the present invention, but rather are examples of catalysts not prepared according to the present invention and these examples have been included for comparison purposes only.

EXAMPLES 1 TO 23

(a) Impregnation of the support

Into a 500 ml. flask provided with 4 rows of Vigreux points, which is mounted on a device for rotating the flask, there is introduced under an atmosphere of nitrogen, the quantity specified in the table which follows, of the support dried for 12 hours, at a temperature of 110° C. under a current of nitrogen. The flask is rotated and pure $TiCl_4$ is added in such a quantity that the product remains pulverulent. The mixture is homogenized by rotating the flask for a period of 1 hour.

(b) Reduction of $TiCl_4$

The flask is cooled down, while being continuously rotated at the temperature indicated, then there is added, dropwise, a quantity of alkylaluminum to obtain the desired Al/Ti atomic ratio. After having added the above quantity of alkylaluminum, the content of the flask which remains pulverized is allowed to warm up at room temperature.

In some cases, the solid so obtained is submitted to a heat treatment at the indicated temperature.

(c) Polymerization

Into a 1.5 liter autoclave which has been dried and flushed with a current of propylene, there are introduced:

5 ml. of a 200 mg./ml. solution of $Al(C_2H_5)_2Cl$;
the specified quantity of the catalyst prepared as described in (b);
hydrogen under a partial pressure of 0.7 kg./cm.$^2$;
1 liter of liquid propylene.

The temperature of the reaction medium is raised to 60° C. and is maintained therein for a period of 5 hours while stirring.

The excess propylene is removed and the polypropylene is recovered.

The results of the polymerization tests carried out with the different catalysts according to the embodiments described hereinbelow are given in the following table:

TABLE 1

| | Support | | | | Alkylaluminum | | |
|---|---|---|---|---|---|---|---|
| Ex. No. | Nature | Specific surface, m.$^2$/g. | Quantity used, grams | $TiCl_4$ introduced, grams | Nature | Quantity, grams | Atomic ratio Al/Ti |
| R1 | | | | | | | |
| R2 | Al$_2$O$_3$ corundum microspheroidal (SAEHS 33-50 of Carborundum). | 4.7 | 20.8 | 7.18 | Al(C$_2$H$_5$)$_2$Cl | [1] 2.79 | 0.6 |
| R3 | | 4.7 | 15.3 | [2] 10.5 | Al(C$_2$H$_5$)$_2$Cl | 4.05 | 0.6 |
| 4 | do | 4.7 | 26.6 | 9.17 | Al(C$_2$H$_5$)$_2$Cl | 3.52 | 0.6 |
| 5 | do | 4.7 | 44.4 | 15.3 | Al(C$_2$H$_5$)$_2$Cl | 5.87 | 0.6 |
| 6 | do | 4.7 | 36.9 | 12.74 | Al(C$_2$H$_5$)$_2$Cl | 4.88 | 0.6 |
| 7 | do | 4.7 | 9.6 | 3.31 | Al(C$_2$H$_5$)$_2$Cl | 1.27 | 0.6 |
| R8 | do | 4.7 | 17.8 | 6.11 | Al(C$_2$H$_5$)$_2$Cl | 2.34 | 0.6 |
| R9 | do | 4.7 | 17.8 | 6.11 | Al(C$_2$H$_5$)$_2$Cl | 2.34 | 0.6 |
| 10 | do | 4.7 | 13.16 | 3.4 | Al(C$_2$H$_5$)Cl$_2$ | 2.4 | 1.05 |
| 11 | Al$_2$O$_3$ $\gamma$ (Ketjen) | 220 | 22.0 | 15.2 | Al(iC$_4$H$_9$)$_2$Cl | 8.7 | 0.62 |
| 12 | SiO$_2$·Celite 410 / 2 SiO$_2$·Al$_2$O$_3$·H$_2$O | 5.1 | 15.15 | 10.5 | Al(C$_2$H$_5$)$_2$Cl | 4.02 | 0.6 |
| 13 | Kaolin Veline PA 12 | 13 | 16.84 | 2.9 | Al(C$_2$H$_5$)$_2$Cl | 1.12 | 0.6 |
| 14 | SiO$_2$-MgO Davison | 450 | 13.8 | 11.9 | Al(iC$_4$H$_9$)$_2$Cl | 6.88 | 0.62 |
| 15 | do | 450 | 13.8 | 11.9 | Al(iC$_4$H$_9$)$_2$Cl | 6.88 | 0.62 |
| 16 | MgO p.p.a. (BDH) | 23.2 | 14.26 | 4.94 | Al(C$_2$H$_5$)$_2$Cl | 1.88 | 0.6 |
| 17 | MgO Seasorb 43 | 59 | 15.4 | 5.35 | Al(C$_2$H$_5$)$_2$Cl | 2.03 | 0.6 |
| 18 | do | 59 | 12.1 | 4.14 | Al(C$_2$H$_5$)$_2$Cl | 1.58 | 0.6 |
| 19 | TiO$_2$ rutile Cabot | 7.7 | 12.6 | 3.28 | Al(C$_2$H$_5$)$_2$Cl | 1.25 | 0.6 |
| 20 | Ca$_5$(PO$_4$)$_3$OH | 39.3 | 10.75 | 3.1 | Al(C$_2$H$_5$)$_2$Cl | 1.19 | 0.6 |
| 21 | Polyethylene (Eltex 6035) | | 15.37 | 5.3 | Al(C$_2$H$_5$)$_2$Cl | 2.02 | 0.6 |
| 22 | Polypropylene [3] | 4.5 | 15.2 | 10.36 | Al(C$_2$H$_5$)$_2$Cl | 3.97 | 0.6 |
| 23 | do | 4.5 | 15.8 | 5.52 | Al(C$_2$H$_5$)$_2$Cl | 2.1 | 0.6 |

[1] Forming a hexane solution containing 56 g./l.; [2] Sticky solid at cold temperature which solidifies as a result of the addition of an excess of TiCl$_4$ not absorbed within the pores of the support; [3] Prepared during a preceding test.

TABLE 2

| Ex. No. | Reduction temperature, °C. | Heat treatment Temperature, °C. | Heat treatment Length of Time, hours. | TiCl₃ content of catalyst, mg./g. | Rate of final reduction, percent molecular | Shade of catalyst |
|---|---|---|---|---|---|---|
| R1 | | | | ¹ 782 | | Violet. |
| R2 | −35 | | | 178 | 94 | Brown. |
| R3 | ² −22 | | | 166 | 58 | Brownish violet. |
| 4 | −35 | | | 173 | 91 | Violet brown. |
| 5 | −35 | 120 | 10 | 191 | 100 | Violet. |
| 6 | −22 | | | 174 | 92 | Violet brown. |
| 7 | −10 | | | 177 | 93 | Brown. |
| R8 | +25 | | | 63 | 33.3 | Do. |
| R9 | +25 | 120 | 2 | 66 | 35 | Violet. |
| 10 | −35 | | | 119 | 81 | Do. |
| 11 | −35 | 70 | 2 | 278 | 100 | Brownish violet. |
| 12 | −35 | | | 251 | 87.6 | Dark brown. |
| 13 | −35 | | | 104 | 92 | Violet. |
| 14 | −35 | 175 | 2 | 320 | 90 | Do. |
| 15 | −35 | 175 | 2 | 320 | 90 | Do. |
| 16 | −35 | | | 171 | 89.5 | Violet brown. |
| 17 | −35 | | | 141 | 65 | Violet. |
| 18 | −10 | | | 154 | 81.6 | Dark brown. |
| 19 | −35 | | | 143 | 92.6 | Violet. |
| 20 | −35 | | | 151 | 90 | Do. |
| 21 | −35 | | | 137 | 72.4 | Brownish violet. |
| 22 | −40 | | | 232 | 84 | Violet. |
| 23 | −35 | | | 161 | 84 | Do. |

¹ 3 TiCl₃·AlCl₃ (TiCl³ AA sold by Stauffer).
² The temperature could not be lowered below the given value because of the tendency to solidify. After the catalyst has been prepared, it has solidified and has not remained pulverulent, with the result that the recovery thereof is obviously limited and difficult.

TABLE 3

| Ex. No. | Polymerization | | | Polymer obtained | | |
|---|---|---|---|---|---|---|
| | Quantity of catalyst used, mg. | PP obtained, grams | Catalytic activity, grams PP/hr., grams TiCl³ | Isotactic character (insoluble in boiling heptane), percent weight | Crystallinity (by differential thermal analysis), percent weight | Intrinsic viscosity at 140° C. in tetralin, dl./ grams |
| R1 | 273 | 151 | 142 | 97.7 | 35.2 | ¹ 13.3 |
| R2 | 276 | 22 | 90 | 53.1 | 28.9 | 1.3 |
| R3 | 339 | 46 | 164 | 82.7 | 41.9 | 1.5 |
| 4 | 331 | 167 | 585 | 81.6 | 37.6 | 2.9 |
| 5 | 354 | 130 | 385 | 91.2 | 51 | 0.16 |
| 6 | 298 | 93 | 358 | 76.6 | 41.2 | 1.9 |
| 7 | 419 | 94 | 253 | 73.2 | 27.1 | 4.4 |
| R8 | 1,058 | 31 | 93 | 84.2 | 39.4 | 1.7 |
| R9 | 900 | 21 | 71 | 78.7 | 35.5 | 1.6 |
| 10 | 1,028 | 119 | 194 | 82.8 | 31.7 | 6.4 |
| 11 | 488 | 152 | 225 | 71.7 | 33 | 2.0 |
| 12 | 459 | 258 | 449 | 71.0 | 37.3 | 4.3 |
| 13 | 489 | 169 | 664 | 86.3 | 38.3 | 2.7 |
| 14 | 335 | 125 | 234 | 86.9 | 42.5 | 1.7 |
| 15 | 385 | 139 | 209 | 93.4 | 34.3 | ¹ 11.1 |
| 16 | 839 | 325 | 455 | 78.0 | 38.3 | 1.7 |
| 17 | 841 | 192 | 325 | 67.5 | 26.2 | 5.5 |
| 18 | 460 | 54 | 152 | 57.3 | 24.6 | 1.8 |
| 19 | 900 | 353 | 551 | | 34 | 4.3 |
| 20 | 695 | 186 | 354 | 75.6 | 37.9 | 1.6 |
| 21 | 950 | 387 | 595 | 71.3 | 35.3 | 1.5 |
| 22 | 434 | 238 | 476 | 80 | 30.8 | 4.4 |
| 23 | 764 | 212 | 345 | 71.2 | 40.3 | 1.6 |

¹ Test carried out in the absence of hydrogen.
NOTE.—PP (polypropylene).

Upon comparing the examples carried out by using the catalysts according to the invention with run R1 which is carried out by using one of the best commercial catalysts, it is obvious that the improvements brought about by the invention are mainly due to the activity, the crystallinity and the isotactic character of the resulting propylene.

A comparison of runs R2 and R3 with Example 4 shows that only by using the process according to the invention is it possible to obtain catalysts having high activity and stereospecificity combined, which are easy to prepare and manipulate.

Runs R8 and R9 compared to Examples 4 to 7 and 18 show a decrease of the activity, which can be observed when the reduction is carried out at a higher temperature. In practice, above 0° C. it is not possible to obtain catalysts which are sufficiently active.

EXAMPLE 24

In a 30 l. autoclave, dried and flushed with a current of propylene, there are introduced:

24 ml. of pure $Al(C_2H_5)_2$;
5.1 g. of the catalyst used in Example 4, or 0.882 g. of $TiCl_3$;
Hydrogen under a partial pressure of 0.5 kg./cm.²;
23 l. of liquid propylene.

The temperature of the mixture is raised to 60° C. and is maintained therein for a period of 30 hours while stirring.

The excess of gaseous propylene is removed and 6.579 kg. of polypropylene are recovered. The propylene has a crystallinity of 30%, as determined by differential thermal analysis, and possesses an intrinsic viscosity of 3.7 dl./g.

During this test, the productivity is 1290 g. of polypropylene per g. of the supported catalyst, the Ti content of the resulting polypropylene is 41 p.p.m., which means that no purification step is required.

EXAMPLE 25

Into a 1.5 l. autoclave dried and flushed with a current of propylene, there are introduced:

88 g. of bead polymerization propylene, prepared during the preceding test, each particle having a diameter between 1.4 and 2 mm. and having been dried under vacuum for a period of 2 hours at 80° C.;

10 ml. of a solution of $Al(C_2H_5)_2Cl$ at a concentration of 200 g./l. in hexane;

0.498 of the catalyst used in Example 6 hereinabove, supported on microspheroidal alumina, for a total of 87 mg. of $TiCl_3$.

The temperature of the reaction mixture is raised to 70° C. and is maintained therein for a period of 4 hours while stirring and providing a partial pressure of gaseous propylene of 10 kg./cm.².

The excess gaseous propylene is removed and a total amount of 165 g. of polypropylene is collected which is sieved so as to separate the beads having a diameter smaller than 1.4 mm. Seventy-seven g. of polypropylene are manufactured during the polymerization test carried out in a gaseous phase.

The activity is 221 g. of polypropylene per hour and per g. of TiCl$_3$. The crystallinity of the polypropylene so obtained, as determined by differential thermal analysis is 36.4% and the melting point is 161° C.

EXAMPLE 26

A catalyst containing 100 mg. of TiCl$_3$ supported on kaolin Veline P A 12 (trademark), is prepared by reducing at a temperature of —35° C., 2.9 g. of TiCl$_4$ absorbed on 16.84 g. of Kaolin, by means of 1.12 g. of Al(C$_2$H$_5$)$_2$Cl.

Into a 1.5 l. autoclave, previously dried and flushed with nitrogen, there are introduced successively:

5 ml. of a solution of Al(C$_2$H$_5$)$_2$Cl having a concentration of 200 g./l.;
1.04 g. of the catalyst prepared as described above;
300 ml. of pure, dry 4-methylpentene-1;
hydrogen under a partial pressure of 0.1 kg./cm.$^2$.

The mixture is heated at 60° C. while stirring and is maintained therein for 5 hours and is cooled down. The resulting polymer is filtered and is dried under vacuum.

There are obtained 64 g. of poly-4-metylpentene-1 having a crystallinity of 18.5% measured by differential thermal analysis, a melting point of 239° C. and an intrinsic viscosity at 160° C., measured in Tetralin, of 3.7 dl./g.

The catalytic activity is 119 g./h.g. TiCl$_3$.

EXAMPLE 27

The polymerization of 750 ml. of butene-1 is carried out at a temperature of 40° C. according to the process described above, under a partial pressure of 250 g./cm.$^2$ of hydrogen.

By using 1.03 g. of a catalyst identical to the one described in Example 26, there are obtained 200 g. of polybutene, for a catalytic activity of 374 g./g. TiCl$_3$.h.

The polybutene was examined by differential thermal analysis and showed a crystallinity of 15.8% and a melting point of 114° C. The intrinsic viscosity measured at 115° C. in Decalin was 1.7 dl./g.

EXAMPLE 28

Into a 250 ml. flask, flushed with nitrogen, there were introduced 14.22 g. of corundum dried at 300° C. for 24 hours, and 1.88 g. of diethylaluminum chloride. The mixture is stirred for a period of 1 hour with a special stirrer adapted for stirring a powder.

The mixture is cooled down to —35° C. during 30 minutes then there are added dropwise, 4.9 g. of pure TiCl$_4$ in order that the atomic ratio Al/Ti becomes 0.6. At the end of the addition, the content of the flask is allowed to warm up at room temperature.

There is obtained a dark brown catalyst having a TiCl$_3$ content of 175 mg./g. and a reducing rate of 92%.

Propylene is polymerized according to the method described in Examples 1 to 23 by means of 374 mg. of the above catalyst.

There are obtained 196 g. of polymer which corresponds to a catalytic activity of 600 g. of polypropylene per hour and per g. of TiCl$_3$. The isotactic character of this product was 75.4% of insoluble matter in boiling heptane and the crystallinity was 36.7%. The intrinsic viscosity was 2.4 dl./g.

EXAMPLE 29

In the apparatus described for the preparation of the catalysts according to Examples 1 to 23, which has been flushed with dry nitrogen, there are introduced 17.72 g. of atomized kaolin Veline P A 12 (trademark), previously dried at 110° C. for a period of 19 hours, and 0.763 g. of pure Al(C$_2$H$_5$)$_3$, which mixture is stirred for a period of 0.5 hour.

The mixture is cooled down to —40° C. during a period of 30 minutes and there are added dropwise 3.02 g. of pure TiCl$_4$ in order that the atomic ratio Al/Ti becomes 0.4. At the end of the addition, the content of the flask is allowed to warm up at room temperature.

There is obtained a dark brown catalyst having a TiCl$_3$ content of 76 mg./g. and a reducing rate of 66.6%.

Propylene is polymerized according to the process of Examples 1 to 23 by means of 123 mg. of the above catalyst.

There are obtained 337 g. of a polymer, which corresponds to a catalytic activity of 550 g. of polypropylene per hour and per g. of TiCl$_3$. The crystallinity of the above product was 39.3%.

Although specific embodiments of the invention have just been described, it is understood that modifications are permissible, the scope of which is to be determined from the appended claims only.

What we claim as new and desire to secure by Letters Patent is:

1. In a method for polymerizing α-olefins in the presence of a solid catalyst comprised of a combination of an organic compound of a metal selected from a member of the group consisting of the elements of Groups I to III of the Periodic Table and a crystalline halide of a transition metal of Groups IVb, Vb and VIb of the Periodic Table in the reduced state deposited on a support, the improvement which comprises carrying out said polymerization in the presence of a catalyst obtained by reducing at a temperature lower than about 0° C. a reactant which is a halide of said transition metal at its maximum valence with a reactant which is an organometallic compound, the metal of said organometallic compound being selected from a member of the group consisting of the elements of Groups I to III of the Periodic Table, wherein the reduction is carried out in the absence of liquid diluent and one of said reactants in liquid form has been absorbed on a solid, porous, pulverulent support material prior to the reduction, the total volume of said absorbed reactant being not higher than the total volume of the pores of said solid support material and the second reactant in liquid form and said solid support material containing the absorbed reactant being combined slowly and under sufficient agitation to maintain the reaction mixture pulverulent.

2. Process according to claim 1 in which prior to the reduction, said halide of said transition metal at its maximum valence is absorbed on a solid pulverulent support and said still pulverulent support with the absorbed halide is cooled to a temperature lower than 0° C. and in which said reduction is then carried out by slowly adding said organometallic compound to said solid pulverulent support containing said absorbed halide of said metal.

3. Process according to claim 1 in which prior to the reduction said organometallic compound is absorbed on a solid pulverulent support and said still pulverulent support containing said organometallic compound is cooled to a temperature lower than 0° C. and in which said reduction is then carried out by slowly adding said halide of said metal at its maximum valence to said solid pulverulent support containing said organometallic compound.

4. Process according to claim 1 in which said halide of a metal of Groups IVb, Vb or VIb at its state of maximum valence is selected from the group consisting of titanium tetrachloride and vanadium tetrachloride.

5. Process according to claim 1 in which the organometallic compound used to reduce said metal halide is the same compound as the organic metal compound which forms the polymerization catalyst.

6. Process according to claim 1 in which the organometallic compound is selected from the group consisting of trialkylaluminum and alkylaluminum halide.

7. Process according to claim 1 in which the inert porous solid support is selected from the group consisting of alumina, silica, aluminum silicates, magnesium silicates, magnesia and titanium oxide.

8. Process according to claim 1 in which said solid support is a polyolefin.

9. Process according to claim 1 in which said solid support is a polyolefin identical to the polyolefin formed during the polymerization.

References Cited

UNITED STATES PATENTS

| | | | |
|---|---|---|---|
| 3,047,551 | 7/1962 | Thomas | 260—88.2 |
| 3,058,963 | 10/1962 | Vandenberg | 260—88.2 |

FOREIGN PATENTS 948,447   2/1964   Great Britain.

HARRY WONG, Jr., Primary Examiner
E. J. SMITH, Assistant Examiner

U.S. Cl. X.R.

260—93.5 S, 94.9 DA